(12) United States Patent
Kellner et al.

(10) Patent No.: US 11,417,995 B2
(45) Date of Patent: Aug. 16, 2022

(54) TRANSMITTING POWER AND DATA TOGETHER IN A ROTORCRAFT USING A SLIP RING ASSEMBLY

(71) Applicant: Sikorsky Aircraft Corporation, Stratford, CT (US)

(72) Inventors: Aaron Kellner, Bloomfield, CT (US); William A. Welsh, North Haven, CT (US); Christopher M. Sutton, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1115 days.

(21) Appl. No.: 15/991,347

(22) Filed: May 29, 2018

(65) Prior Publication Data

US 2019/0372288 A1    Dec. 5, 2019

(51) Int. Cl.
| | | |
|---|---|---|
| *B60R 16/03* | (2006.01) | |
| *H01R 39/08* | (2006.01) | |
| *H01R 39/34* | (2006.01) | |
| *B64C 27/32* | (2006.01) | |
| *H02K 13/00* | (2006.01) | |
| *B64C 27/04* | (2006.01) | |
| *H01R 39/18* | (2006.01) | |

(52) U.S. Cl.
CPC ............ *H01R 39/08* (2013.01); *B60R 16/03* (2013.01); *B64C 27/04* (2013.01); *B64C 27/32* (2013.01); *H01R 39/18* (2013.01); *H01R 39/34* (2013.01); *H02K 13/003* (2013.01); *B64D 2221/00* (2013.01)

(58) Field of Classification Search
CPC ........ H01R 39/08; H01R 39/18; H01R 39/34; B60R 16/03; B64C 27/04; B64C 27/32; H02K 13/003; B64D 2221/00; B64D 41/00; B64D 47/02; Y02T 50/40
See application file for complete search history.

(56) References Cited

U.S. PATENT DOCUMENTS

| | | |
|---|---|---|
| 8,260,019 B2 | 9/2012 | Chandra |
| 8,983,163 B2 | 3/2015 | Chandra |
| 9,263,838 B1 * | 2/2016 | Zhang .................... H01R 39/24 |

(Continued)

*Primary Examiner* — Lincoln D Donovan
*Assistant Examiner* — Alex W Lam
(74) *Attorney, Agent, or Firm* — Michael Best & Friedrich LLP (57) ABSTRACT

A computer-implemented method and system for transmitting power and data together in a rotorcraft using a slip ring assembly is disclosed. According to one example, a computer-implemented method includes providing a slip ring assembly comprising a stationary element coupled to an airframe of a rotorcraft and a rotatable element rotatable relative to the stationary element and coupled to a rotor assembly of the rotorcraft. Power is transmitted from a power source associated with the airframe to an electronic device associated with the rotor assembly, the slip ring assembly being configured to complete an electrical circuit between the power source and the electronic device to provide power from the power source to the electronic device. Data is transmitted from a first data transceiver associated with the airframe to a second data transceiver associated with the rotor assembly via the electrical circuit completed by the slip ring assembly.

17 Claims, 4 Drawing Sheets

(56) References Cited

U.S. PATENT DOCUMENTS

| | | | |
|---|---|---|---|
| 2004/0183696 A1* | 9/2004 | Low | G09F 9/33 |
| | | | 340/945 |
| 2006/0226292 A1* | 10/2006 | Houlihan | B64D 15/22 |
| | | | 244/134 R |
| 2009/0236468 A1* | 9/2009 | Welsh | F16F 7/1011 |
| | | | 244/17.11 |
| 2013/0234653 A1* | 9/2013 | Botts | H02K 31/02 |
| | | | 310/68 B |
| 2015/0156494 A1 | 6/2015 | Chandra | |

* cited by examiner

TRANSMITTING POWER AND DATA TOGETHER IN A ROTORCRAFT USING A SLIP RING ASSEMBLY

BACKGROUND OF THE INVENTION

Aspects of the present invention are directed to rotor systems and more particularly to slip ring assemblies for transmitting power and data together in a rotorcraft.

An aircraft can include a component that changes position or is otherwise in motion relative to another component of the aircraft. Take, for example, a helicopter that includes a rotor assembly having rotor blades attached thereto. The rotor assembly is connected to a rotor mast that rotates about an axis and is driven by an engine. When the engine rotates the rotor mast, the rotor assembly rotates with respect to an airframe of the helicopter to cause the helicopter to fly and maneuver.

Rotorcraft commonly employ rotor systems to generate lift and provide control for the aircraft during flight. Some rotor systems employ rotor assemblies with electrical devices fixed to rotary portions of the rotor assembly, such as to the rotor assembly hub and/or rotor blades. Examples of such electrical devices include sensors, heater mats for ice protection systems, and actuators for active vibration control systems. Such devices generally communicate with electrical components in the rotorcraft airframe, typically using electrical signals or electrical power conveyed across an interface between a stationary component and a rotating component. Slip ring assemblies, for example, communicate electrical signals or power across such interfaces using a brush and metal plate arrangement. As one rotates relative to the other, electrical current crosses the interface by flowing between the brush and metal plate.

In some cases, it may be desirable to send and/or receive power and data between components on the aircraft that are moving with respect to each other. For example, lights (e.g., a navigation light) and sensors (e.g., a vibration sensor) can be attached to an end of a rotor blade on a rotor assembly. It is therefore desirable to send power to the light to cause the light to illuminate and to receive data from the sensor to receive sensor readings.

SUMMARY OF THE INVENTION

According to one or more embodiments of the present invention, a rotorcraft comprises: an airframe, the airframe comprising a power source and a first data transceiver, a rotor assembly rotatable about an axis with respect to the airframe, the rotor assembly comprising an electronic device and a second data transceiver; and a slip ring assembly comprising a stationary element coupled to the airframe and a rotatable element rotatable relative to the stationary element and coupled to the rotor assembly, the slip ring assembly being configured to complete an electrical circuit between the power source and the electronic device to provide power from the power source to the electronic device, wherein the first data transceiver is configured to encode data and transmit the encoded data to the second data transceiver via the electrical circuit completed by the slip ring assembly, and wherein the second data transceiver is configured to receive the encoded data via the electrical circuit completed by the slip ring assembly and decode the data.

According to one or more embodiments of the present invention, the second data transceiver is configured to encode second data and transmit the second encoded data to the first data transceiver via the electrical circuit completed by the slip ring assembly, and wherein the first data transceiver is configured to receive the second encoded data via the electrical circuit completed by the slip ring assembly and decode the second encoded data.

According to one or more embodiments of the present invention, the stationary element comprises a plurality of brushes, the plurality of brushes being in electrical contact with the rotatable element to complete the electrical circuit According to one or more embodiments of the present invention, the plurality of brushes comprise composite carbon fiber and silver brushes.

According to one or more embodiments of the present invention, the plurality of brushes generate noise in the electrical circuit, and wherein the first data transceiver and the second data transceiver are configured to filter the noise generated by the plurality of brushes.

According to one or more embodiments of the present invention, the noise generated by the plurality of brushes is less than an amount of noise that can be filtered by the first data transceiver and the second data transceiver.

According to one or more embodiments of the present invention, the rotatable element comprises a plurality of brushes, the plurality of brushes being in electrical contact with the stationary element to complete the electrical circuit.

According to one or more embodiments of the present invention, the plurality of brushes comprise composite carbon fiber and silver brushes.

According to one or more embodiments of the present invention, the plurality of brushes generate noise in the electrical circuit, wherein the first data transceiver and the second data transceiver are configured to filter the noise generated by the plurality of brushes, and wherein the noise generated by the plurality of brushes is less than an amount of noise that can be filtered by the first data transceiver and the second data transceiver.

According to one or more embodiments of the present invention, a method comprises providing a slip ring assembly comprising a stationary element coupled to an airframe of a rotorcraft and a rotatable element rotatable relative to the stationary element and coupled to a rotor assembly of the rotorcraft, the rotor assembly rotatable about an axis with respect to the airframe; transmitting power from a power source associated with the airframe to an electronic device associated with the rotor assembly, the slip ring assembly being configured to complete an electrical circuit between the power source and the electronic device to provide power from the power source to the electronic device; and transmitting data from a first data transceiver associated with the airframe to a second data transceiver associated with the rotor assembly, wherein the first data transceiver is configured to encode data and transmit the encoded data to the second data transceiver via the electrical circuit completed by the slip ring assembly, and wherein the second data transceiver is configured to receive the encoded data via the electrical circuit completed by the slip ring assembly and decode the data.

According to one or more embodiments of the present invention, the stationary element comprises a plurality of brushes, the plurality of brushes being in electrical contact with the rotatable element to complete the electrical circuit.

According to one or more embodiments of the present invention, the plurality of brushes comprise composite carbon fiber and silver brushes.

According to one or more embodiments of the present invention, the plurality of brushes generate noise in the electrical circuit, and wherein the first data transceiver and the second data transceiver are configured to filter the noise generated by the plurality of brushes.

According to one or more embodiments of the present invention, the noise generated by the plurality of brushes is less than an amount of noise that can be filtered by the first data transceiver and the second data transceiver.

According to one or more embodiments of the present invention, the rotatable element comprises a plurality of brushes, the plurality of brushes being in electrical contact with the stationary element to complete the electrical circuit over which both power and data are serviced, wherein the plurality of brushes comprise composite carbon fiber and silver brushes, wherein the plurality of brushes generate noise in the electrical circuit, wherein the first data transceiver and the second data transceiver are configured to filter the noise generated by the plurality of brushes, and wherein the noise generated by the plurality of brushes is less than an amount of noise that can be filtered by the first data transceiver and the second data transceiver.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Aircraft, such as rotorcraft, often send power and data to various components of the aircraft. For example, power can be sent to navigational lights, sensors, heater mats for ice protection systems, actuators to actuate control surfaces, and various other components. It may also be desirable to send data to such components. For example, lights (e.g., a navigation light) and sensors (e.g., a vibration sensor) can be attached to an end of a rotor blade on a rotor assembly. It is therefore desirable to send power to the light to cause the light to illuminate and to receive data from the sensor to receive sensor readings.

Some components are in motion with respect to an airframe. For example, the light and sensor attached to an end of the rotor blade on the rotor assembly in the preceding example rotate about an axis (e.g., in a rotating frame) with respect to the airframe (e.g., in a fixed frame) when the rotor assembly is in motion. To create the multiplicity of electrical circuits (for transmitting power and data) between the fixed frame (e.g., the airframe) and the rotating frame (e.g., the rotor assembly), slip ring assemblies can be used. A slip ring is an electromechanical device that facilitates the transmission of electrical signals (e.g., power, data) from the fixed frame to the rotating frame. In the case of rotorcraft, slip rings must carry large amounts of power. Consequently, noise is introduced at the slip rings, and therefore these slip rings are traditionally not suitable for transmitting both power and data.

Current implementations use separate slip rings and/or separate slip ring assemblies to create a multiplicity of circuits that can transmit power and data separately. For example, one electrical circuit transmits power, while another electrical circuit transmits data. However, this increases aircraft cost and weight. It is desirable to eliminated weight and complexity in aircraft where both data and power are to be simultaneously conducted from the fixed frame to the rotating frame. The present techniques address these problems by providing for the transmission of power and data together via a single circuit using one slip ring assembly instead of a multiplicity of circuits. More particularly, the present techniques provide a combination of extra quiet fiber brush slip rings capable of carrying large currents with minimal arching and electrical noise with the use of advanced power line modems (i.e., data transceivers) configured to operate at high data rates for implementing the conveyance of data through the rotating frame from the fixed frame. This enables a single circuit to conduct power and data together. The present techniques eliminate the need for a slip ring to provide accommodation for each type of service (i.e., power and data) separately. Slip rings that create circuits particular to the data side alone can be eliminated, thereby saving weight and complexity on the slip ring assembly. This is ideal for rotary wing applications where both data and power need to be conveyed to the rotor head.

Figure 1:
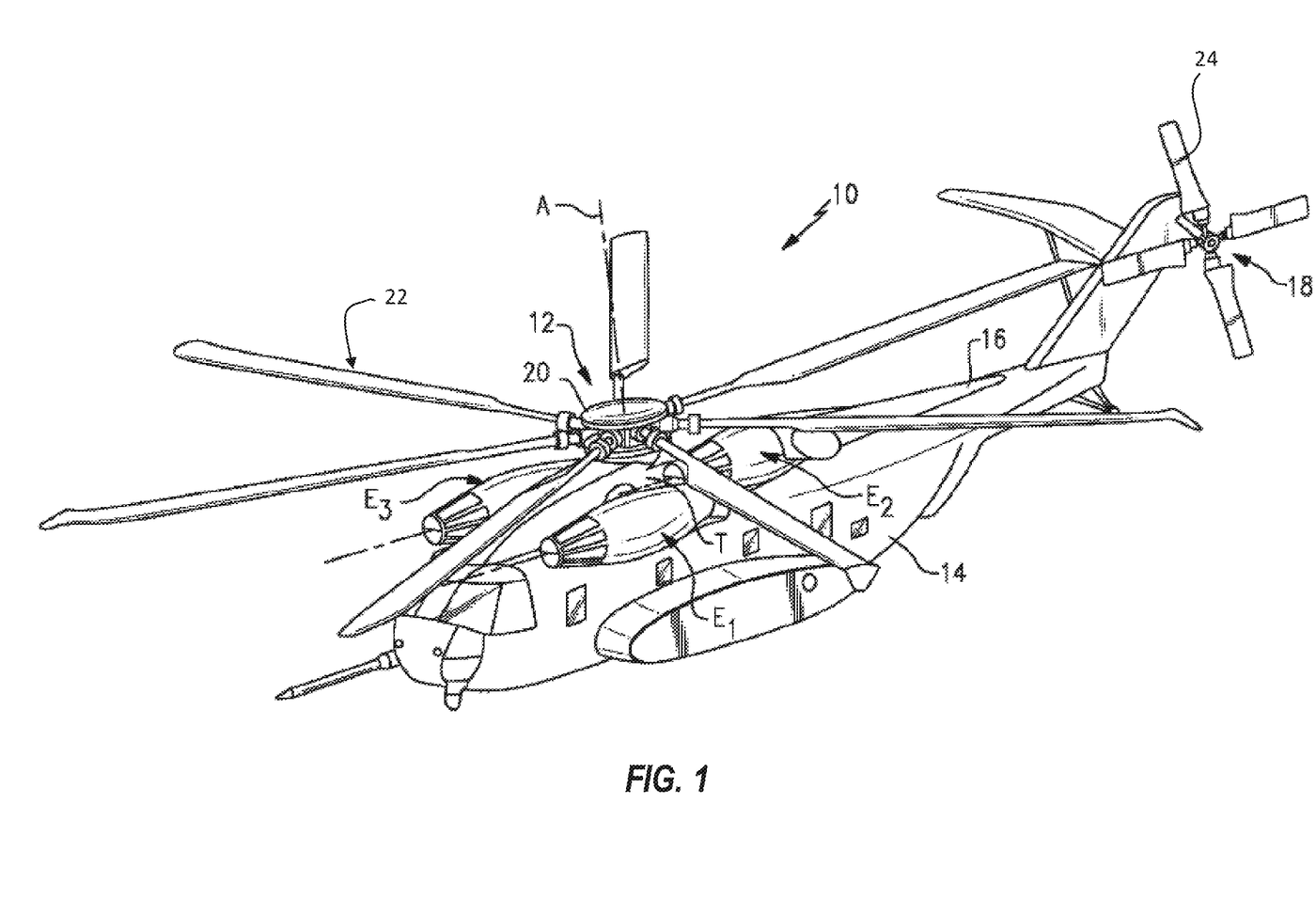
FIG. 1 illustrates a perspective view of an example of a rotary wing aircraft according to aspects of the present disclosure.

Referring now to the figures. FIG. 1 schematically illustrates an example of a rotary wing aircraft 10 (i.e., a "rotorcraft") having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed-wing aircraft, will also benefit from embodiments of the invention.

Figure 2:
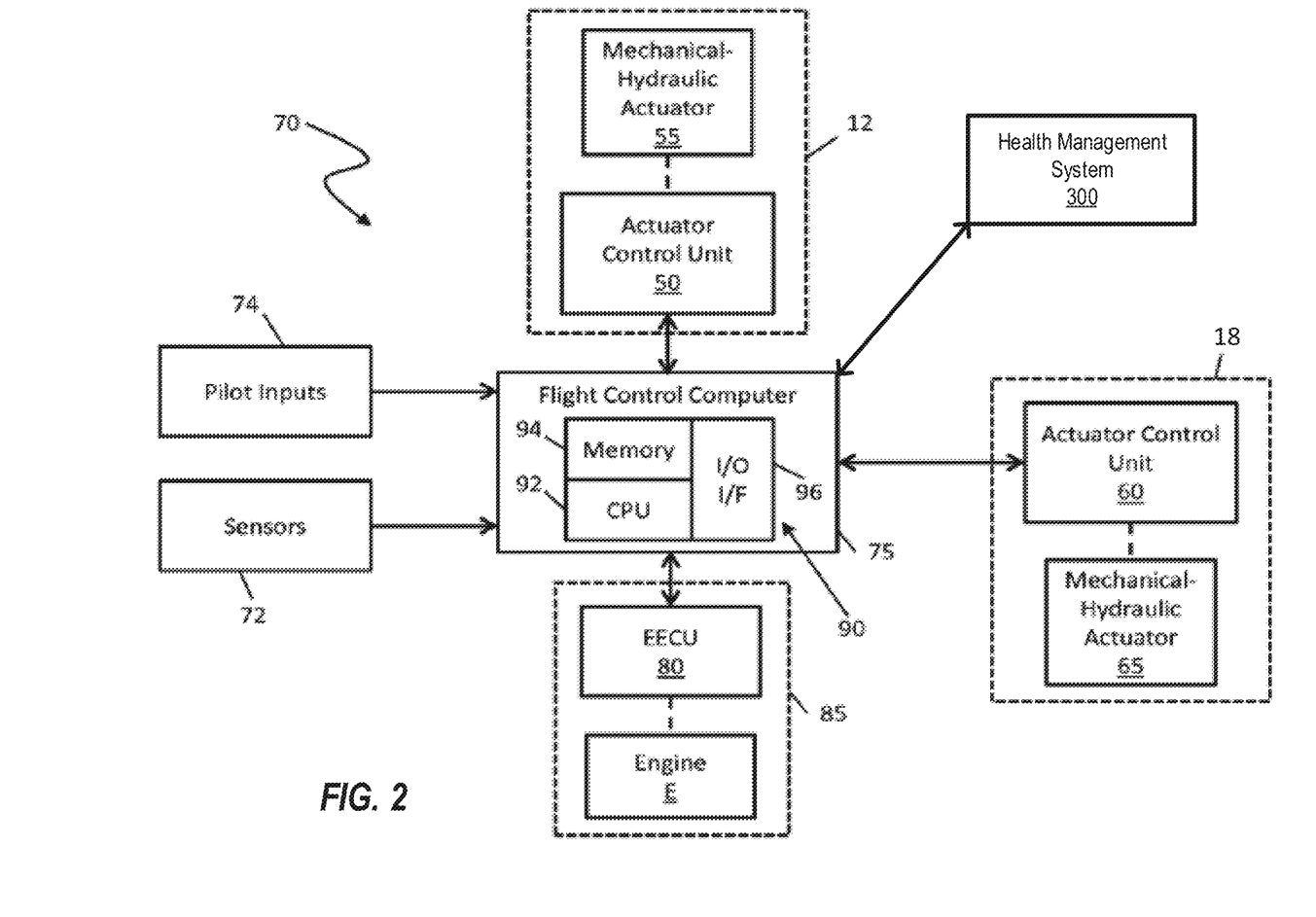
FIG. 2 illustrates a block diagram of a flight control system of an aircraft according to aspects of the present disclosure.

Portions of the aircraft 10, such as the main rotor assembly 12 and the tail rotor system 18 for example, are driven by a flight control system 70 illustrated in FIG. 2. In one embodiment, the flight control system 70 is a fly-by-wire (FBW) control system. In a FBW control system, there is no direct mechanical coupling between a pilot's controls and movable components or control surfaces, such as rotor blade assemblies or tail rotor blades 24 for example, of the aircraft 10 of FIG. 1. Instead of using mechanical linkages, a FBW control system includes a plurality of sensors 72 which can sense the position of controlled elements and generate electrical signals proportional to the sensed position. The sensors 72 can also be used directly and indirectly to provide a variety of aircraft state data to a flight control computer (FCC) 75. The FCC 75 can also receive pilot inputs 74 as control commands to control the lift, propulsive thrust, yaw, pitch, and roll forces and moments of the various control surfaces of the aircraft 10.

Although a particular aircraft configuration is illustrated and described in the disclosed embodiment, other configurations of aircraft and vehicles, such as single and/or multi-engine fixed wing aircraft, vertical take-off and landing (VTOL) rotary wing aircraft, high speed compound rotary wing aircraft with supplemental translational thrust systems, dual contra-rotating, coaxial rotor system aircraft, tilt-rotors and tilt-wing aircraft, and fixed-wing aircraft can also benefit from embodiments of the disclosure.

In response to inputs from the sensors 72 and pilot inputs 74, the FCC 75 transmits signals to various subsystems of the aircraft 10, such as the main rotor assembly 12 and the tail rotor system 18. The FCC 75 can use reference values in the pilot inputs 74 for feedforward control to quickly respond to changes in the reference values and can perform feedback control to reject disturbances detected via the sensors 72. Pilot inputs 74 can be in the form of stick commands and/or beeper commands to set and incrementally adjust reference values for controllers. The pilot inputs 74 need not be directly provided by a human pilot, but may be driven by an automatic pilot, a remote control, a navigation-based control, or one or more outer control loops configured to produce one or more values used to pilot the aircraft 10.

The main rotor assembly 12 can include an actuator control unit 50 configured to receive commands from the FCC 75 to control one or more actuators 55, such as a mechanical-hydraulic actuator or electromechanical actuator (or another suitable actuator), for the rotor blade assemblies of FIGS. 1 and 2. In an embodiment, pilot inputs 74 including cyclic and/or collective commands can result in the actuator control unit 50 driving the one or more actuators 55 to adjust a swashplate assembly to control the rotor blade assemblies of FIG. 1. Alternatively, the FCC 75 can directly control the one or more actuators 55, and the actuator control unit 50 can be omitted.

The tail rotor system 18 can include an actuator control unit 60 configured to receive commands from the FCC 75 to control one or more actuators 65, such as a mechanical-hydraulic actuator (or another suitable actuator), associated with one or more tail rotor or propeller blades 24. In an embodiment, pilot inputs 74 include a blade pitch command for the actuator control unit 60 to drive the one or more actuators 65 for controlling the tail rotor blades FIG. 1. Alternatively, the FCC 75 can directly control the one or more actuators 65, and the actuator control unit 60 can be omitted.

The FCC 75 can also interface with an engine control system 85 including one or more electronic engine control units (EECUs) 80 to control the engines E. Each EECU 80 can be a digital electronic control unit such as Full Authority Digital Engine Control (FADEC) electronically interconnected to a corresponding engine E. Each engine E can include one or more instances of the EECU 80 to control engine output and performance. Engines E can be commanded in response to the pilot inputs 74, such as a throttle command.

Rather than simply passing pilot inputs 74 through to various control units 50, 60, and 80, the FCC 75 includes a processing system 90 that applies models and control laws to augment commands. The processing system 90 includes processing circuitry 92, memory 94, and an input/output (I/O) interface 96. The processing circuitry 92 can be any type or combination of computer processors, such as a microprocessor, microcontroller, digital signal processor, application-specific integrated circuit, programmable logic device, and/or field programmable gate array, and is generally referred to as central processing unit (CPU) 92. The memory 94 can include volatile and non-volatile memory, such as random-access memory (RAM), read-only memory (ROM), or other electronic, optical, magnetic, or any other computer-readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, pilot inputs 74, and other sources (not depicted) and can communicate with the control units 50, 60, 80, and other subsystems (not depicted).

Figures 3, 4:
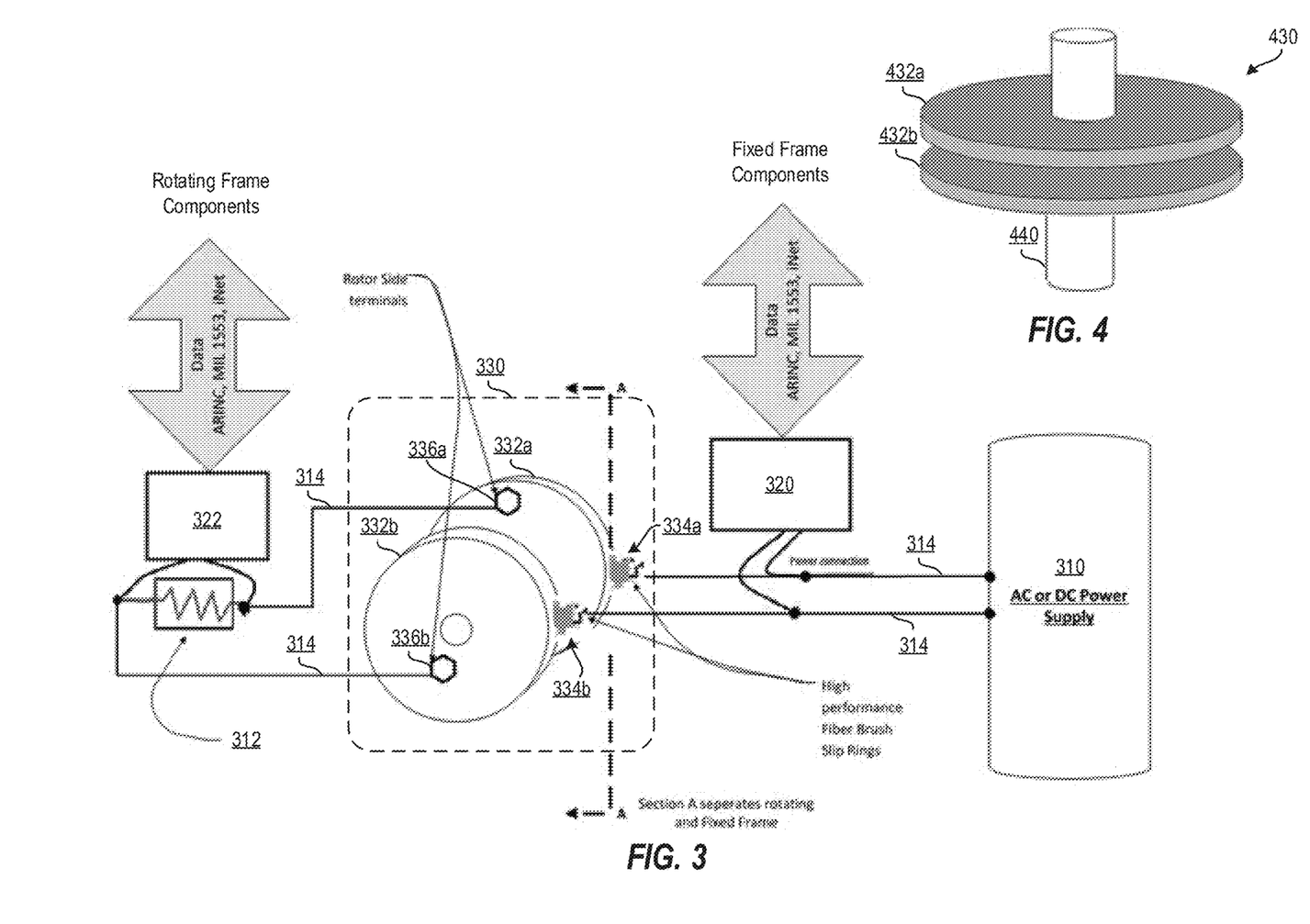
FIG. 3 depicts a block diagram of slip ring assembly for transmitting power and data together on the same electrical circuit in a rotorcraft according to one or more embodiments of the present invention.
FIG. 4 depicts a slip ring assembly in a vertical orientation according to one or more embodiments of the present invention.

FIG. 3 depicts a block diagram of slip ring assembly 330 for transmitting power and data together in a rotorcraft according to one or more embodiments of the present invention. The slip ring assembly 330 includes a first slip ring 332a and a second slip ring 332b. The first slip ring 332a forms an electrical connection with the slip ring brush 334a, and the second slip ring 332b forms an electrical connection with the slip ring brush 334b. The slip ring brushes 334a, 334b are high-performance fiber brushes that are a composite material including carbon fiber and silver, although other materials can be used.

The slip ring assembly 330 separates a rotating frame and a fixed frame at line A. The rotating frame can include the main rotor assembly 12 while the fixed frame can include the airframe 15. The slip ring brushes 334a, 334b are stationary elements. That is, the slip ring brushes 334a, 334b are in the fixed frame and are stationary with respect to the airframe 15. The slip rings 332a. 332b are rotatable elements in the rotating frame and are rotatable relative to the stationary elements (e.g., the slip ring brushes 334a, 334b) of the fixed frame.

The airframe 15 includes a power source 310 (in the fixed frame), which can be an AC or DC power source configured to supply power to a power load (e.g., an electronic device 312) in the rotating frame. To do this, the slip ring assembly 330 creates an electrical circuit 314 between the power source 310 and the electronic device 312 to provide power from the power source 310 to the electronic device 312. Rotor side terminals 336a, 336b are used to electrically connect elements of the electrical circuit 314 (e.g., electrical cables) to the slip rings 332a. 332b respectively.

Data can be transmitted via the electrical circuit 314 by injecting data into the circuit 314 using a data transceiver, such as the first data transceiver 320 and/or the second data transceiver 322 (collectively, transceivers 320, 322). This enables the use of a single electrical circuit (e.g., the circuit 314) instead of a multiplicity of electrical circuits as implemented in traditional approaches. To do this, the transceivers 320, 322 are electrically connected to the circuit 314. The transceivers 320, 322 encode for transmission and decode data by filtering noise out of the circuit 314 when receiving data. As an example, the first data transceiver 320 is configured to encode data and transmit the encoded data to the second data transceiver 322 via the electrical circuit 314 completed by the slip ring assembly 330. The second data transceiver 322 is configured to receive the encoded data via the electrical circuit completed by the slip ring assembly and decode the data by filtering the data to remove noise from the transmission over the circuit 314. Noise can be created, for example, by friction between the slip rings 332a, 332b and the respective slip ring brushes 334a, 334b. The transceivers 320, 322 should be able to remove the noise created in the slip ring assembly 330 to enable the data transmission/reception via the circuit 314.

The first data transceiver 320 can send data to and receive data from fixed frame components, such as flight control computers, flight control systems, and the like, using any suitable communication protocol. Similarly, the second data transceiver 322 can send data to and receive data from rotating frame components, such as navigational lights, sensors, heaters, actuators, and the like, using any suitable communication protocol. In this way, components in the fixed frame can send data to and receive data from components in the rotating frame via the electrical circuit 314 created by the slip ring assembly 330.

FIG. 4 depicts a slip ring assembly 430 in a vertical orientation according to one or more embodiments of the present invention. In particular, the slip ring assembly 430 includes two slip rings 432a, 432b mounted on a rotor mast 440 of a rotor assembly (e.g., the main rotor assembly 12) to form electrical connections via slip ring brushes (e.g., the slip ring brushes 334a, 334b). It should be appreciated that the slip ring assembly 430 can also be configured in a horizontal orientation, such as part of the tail rotor system 18, or in another suitable orientation.

Figure 5:
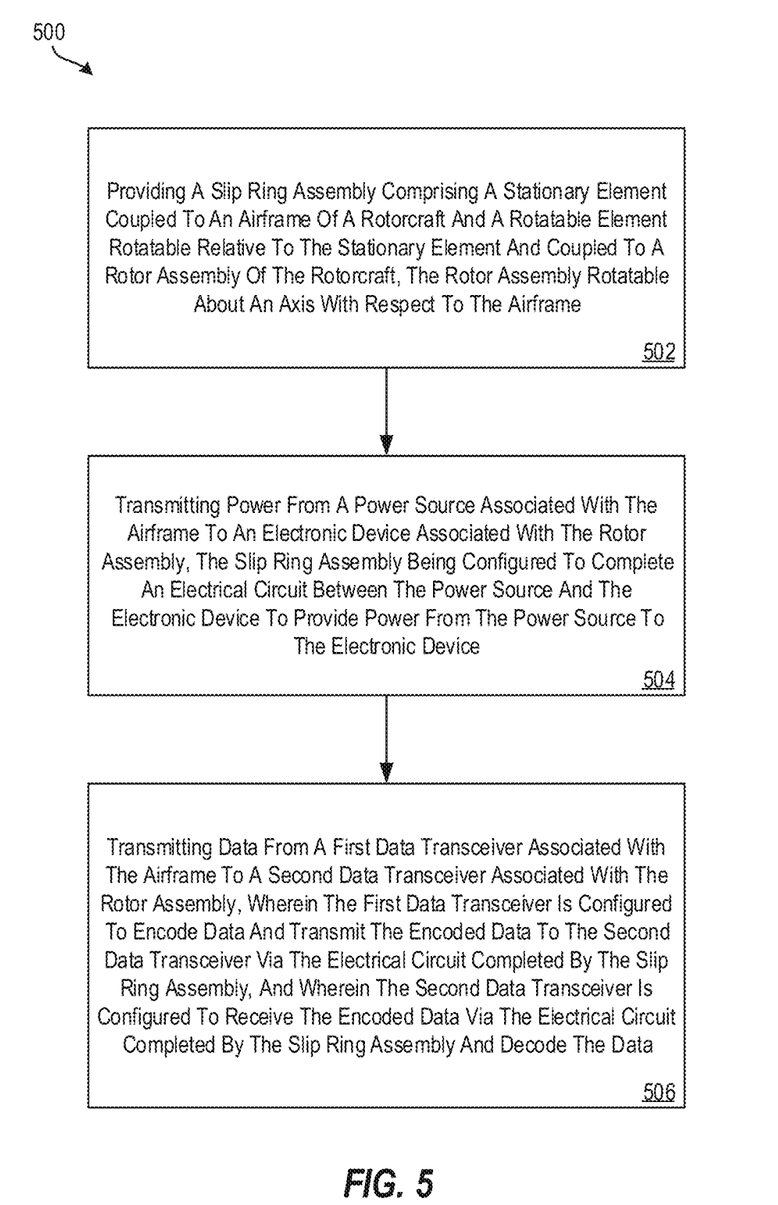
FIG. 5 depicts a method for transmitting power and data together in a rotorcraft using a slip ring assembly according to one or more embodiments of the present invention.

FIG. 5 depicts a method 500 for transmitting power and data together in a rotorcraft using a slip ring assembly according to one or more embodiments of the present invention. The method 500 begins at block 502.

At block 502, a slip ring assembly is provided. The slip ring assembly includes a stationary element coupled to an airframe (e.g., the airframe 15) of a rotorcraft (e.g., the rotary wing aircraft 10). The slip ring assembly also includes a rotatable element rotatable relative to the stationary element and coupled to a rotor assembly (e.g., the rotor assembly 12) of the rotorcraft. The rotor assembly is rotatable about an axis with respect to the airframe.

At block 504, power is transmitted from a power source (e.g., the power source 310) associated with the airframe to an electronic device (e.g., the electronic device 312) associated with the rotor assembly. The slip ring assembly is configured to complete an electrical circuit (e.g., electrical circuit 314) between the power source and the electronic device to provide power from the power source to the electronic device.

At block 506, data is transmitted from a first data transceiver (e.g., the data transceiver 320) associated with the airframe to a second data transceiver (e.g., the data transceiver 322) associated with the rotor assembly. The first data transceiver is configured to encode data and transmit the encoded data to the second data transceiver via the electrical circuit (i.e., the same circuit used to provide power from the power source to the electronic device) completed by the slip ring assembly. The second data transceiver is configured to receive the encoded data via the electrical circuit completed by the slip ring assembly and decode the data. Accordingly, a single circuit is used to conduct power and data between the fixed frame and the rotating frame instead of a multiplicity of circuits used in traditional implementations.

Additional processes also can be included, and it should be understood that the processes depicted in FIG. 5 represent illustrations and that other processes can be added or existing processes can be removed, modified, or rearranged without departing from the scope and spirit of the present disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention can include only some of the described embodiments. Accordingly, the invention is not to be seen as limited by the foregoing description.

What is claimed is:

1. A rotorcraft comprising:
an airframe, the airframe comprising a power source and a first data transceiver;
a rotor assembly rotatable about an axis with respect to the airframe, the rotor assembly comprising an electronic device and a second data transceiver; and
a slip ring assembly comprising a stationary element coupled to the airframe and a rotatable element rotatable relative to the stationary element and coupled to the rotor assembly, the slip ring assembly being configured to complete an electrical circuit between the power source and the electronic device to provide power from the power source to the electronic device,
wherein the first data transceiver is configured to encode data and transmit the encoded data to the second data transceiver via the electrical circuit completed by the slip ring assembly, and
wherein the second data transceiver is configured to receive the encoded data via the electrical circuit completed by the slip ring assembly and decode the data,
wherein the second data transceiver is configured to encode second data and transmit the second encoded data to the first data transceiver via the electrical circuit completed by the slip ring assembly, and wherein the first data transceiver is configured to receive the second encoded data via the electrical circuit completed by the slip ring assembly and decode the second encoded data.

2. The rotorcraft of claim 1, wherein the stationary element comprises a plurality of brushes, the plurality of brushes being in electrical contact with the rotatable element to complete the electrical circuit.

3. The rotorcraft of claim 2, wherein the plurality of brushes comprise composite carbon fiber and silver brushes.

4. The rotorcraft of claim 2, wherein the plurality of brushes generate noise in the electrical circuit, and wherein the first data transceiver and the second data transceiver are configured to filter the noise generated by the plurality of brushes.

5. The rotorcraft of claim 4, wherein the noise generated by the plurality of brushes is less than an amount of noise that can be filtered by the first data transceiver and the second data transceiver.

6. The rotorcraft of claim 1, wherein the rotatable element comprises a plurality of brushes, the plurality of brushes being in electrical contact with the stationary element to complete the electrical circuit.

7. The rotorcraft of claim 6, wherein the plurality of brushes comprise composite carbon fiber and silver brushes.

8. The rotorcraft of claim 6, wherein the plurality of brushes generate noise in the electrical circuit, wherein the first data transceiver and the second data transceiver are configured to filter the noise generated by the plurality of brushes, and wherein the noise generated by the plurality of brushes is less than an amount of noise that can be filtered by the first data transceiver and the second data transceiver.

9. A method comprising:
providing a slip ring assembly comprising a stationary element coupled to an airframe of a rotorcraft and a rotatable element rotatable relative to the stationary element and coupled to a rotor assembly of the rotorcraft, the rotor assembly rotatable about an axis with respect to the airframe;
transmitting power from a power source associated with the airframe to an electronic device associated with the rotor assembly, the slip ring assembly being configured to complete an electrical circuit between the power source and the electronic device to provide power from the power source to the electronic device; and
transmitting data from a first data transceiver associated with the airframe to a second data transceiver associated with the rotor assembly,
wherein the first data transceiver is configured to encode data and transmit the encoded data to the second data transceiver via the electrical circuit completed by the slip ring assembly, and
wherein the second data transceiver is configured to receive the encoded data via the electrical circuit completed by the slip ring assembly and decode the data,
wherein the stationary element comprises a plurality of brushes, the plurality of brushes being in electrical contact with the rotatable element to complete the electrical circuit, and
wherein the plurality of brushes generate noise in the electrical circuit, and wherein the first data transceiver and the second data transceiver are configured to filter the noise generated by the plurality of brushes.

10. The computer-implemented method of claim 9, wherein the plurality of brushes comprise composite carbon fiber and silver brushes.

11. The computer-implemented method of claim 9, wherein the noise generated by the plurality of brushes is less than an amount of noise that can be filtered by the first data transceiver and the second data transceiver.

12. The computer-implemented method of claim 9, wherein the rotatable element comprises a plurality of brushes, the plurality of brushes being in electrical contact with the stationary element to complete the electrical circuit over which both power and data are serviced, wherein the plurality of brushes comprise composite carbon fiber and silver brushes, wherein the plurality of brushes generate noise in the electrical circuit, wherein the first data transceiver and the second data transceiver are configured to filter the noise generated by the plurality of brushes, and wherein the noise generated by the plurality of brushes is less than an amount of noise that can be filtered by the first data transceiver and the second data transceiver.

13. A rotorcraft comprising:
an airframe, the airframe comprising a power source and a first data transceiver;
a rotor assembly rotatable about an axis with respect to the airframe, the rotor assembly comprising an electronic device and a second data transceiver; and
a slip ring assembly comprising a stationary element coupled to the airframe and a rotatable element rotatable relative to the stationary element and coupled to the rotor assembly, the slip ring assembly being configured to complete an electrical circuit between the power source and the electronic device to provide power from the power source to the electronic device,
wherein the first data transceiver is configured to encode data and transmit the encoded data to the second data transceiver via the electrical circuit completed by the slip ring assembly, and
wherein the second data transceiver is configured to receive the encoded data via the electrical circuit completed by the slip ring assembly and decode the data,
wherein the rotatable element comprises a plurality of brushes, the plurality of brushes being in electrical contact with the stationary element to complete the electrical circuit.

14. The rotorcraft of claim 13, wherein the second data transceiver is configured to encode second data and transmit the second encoded data to the first data transceiver via the electrical circuit completed by the slip ring assembly, and wherein the first data transceiver is configured to receive the second encoded data via the electrical circuit completed by the slip ring assembly and decode the second encoded data.

15. The rotorcraft of claim 13, wherein the plurality of brushes generate noise in the electrical circuit, and wherein the first data transceiver and the second data transceiver are configured to filter the noise generated by the plurality of brushes.

16. The rotorcraft of claim 15, wherein the noise generated by the plurality of brushes is less than an amount of noise that can be filtered by the first data transceiver and the second data transceiver.

17. The rotorcraft of claim 13, wherein the plurality of brushes comprise composite carbon fiber and silver brushes.

* * * * *